United States Patent
Peng et al.

(10) Patent No.: US 7,298,540 B2
(45) Date of Patent: Nov. 20, 2007

(54) EQUALIZING OPTICAL WAVELENGTH ROUTERS

(75) Inventors: Song Peng, Pleasanton, CA (US); Ming Li, Pleasanton, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/225,936

(22) Filed: Aug. 22, 2002

(65) Prior Publication Data

US 2004/0008932 A1    Jan. 15, 2004

Related U.S. Application Data

(60) Provisional application No. 60/314,351, filed on Aug. 22, 2001.

(51) Int. Cl.
*G02F 1/01* (2006.01)
*G02B 5/30* (2006.01)
*G02B 5/18* (2006.01)
*H04J 14/02* (2006.01)
*H04J 14/06* (2006.01)

(52) U.S. Cl. .................. 359/256; 359/316; 359/485; 359/566; 359/250; 398/49; 398/65; 398/87

(58) Field of Classification Search ............... 359/247, 359/250, 256, 495, 496, 246, 316, 485, 566; 385/11, 24, 37; 398/49, 84, 86, 65, 87
See application file for complete search history.

(56) References Cited

U.S. PATENT DOCUMENTS

| | | | |
|---|---|---|---|
| 5,960,133 A * | 9/1999 | Tomlinson | |
| 6,097,859 A * | 8/2000 | Solgaard et al. | |
| 6,204,946 B1 * | 3/2001 | Aksyuk et al. | |
| 6,263,127 B1 * | 7/2001 | Dragone et al. | |
| 6,275,623 B1 * | 8/2001 | Brophy et al. | |
| 6,529,307 B1 * | 3/2003 | Peng et al. | |
| 6,549,699 B2 * | 4/2003 | Belser et al. | |
| 6,594,082 B1 * | 7/2003 | Li et al. | |
| 6,625,346 B2 * | 9/2003 | Wilde | 385/24 |
| 6,657,770 B2 * | 12/2003 | Marom et al. | |
| 6,658,212 B1 * | 12/2003 | Trutna et al. | 398/84 |
| 6,661,948 B2 * | 12/2003 | Wilde | |
| 6,668,115 B2 * | 12/2003 | Lin et al. | |
| 6,694,073 B2 * | 2/2004 | Golub et al. | |
| 6,728,488 B1 * | 4/2004 | Peng et al. | |
| 6,760,511 B2 * | 7/2004 | Garrett et al. | 385/24 |
| 6,947,628 B1 * | 9/2005 | Peng et al. | 385/18 |

\* cited by examiner

*Primary Examiner*—Ricky D. Shafer
(74) *Attorney, Agent, or Firm*—Patterson & Sheridan, LLP

(57) ABSTRACT

A dynamic equalizing optical channel router includes an input port for receiving a wavelength division multiplexed composite optical signal comprising a plurality of channels; at least one output port; a diffraction grating optically coupled to the input and output ports; a lens optically coupled to the diffraction grating at a side opposite to the input and output ports; an array of steering devices optically coupled to the lens at a side opposite to the diffraction grating, wherein each channel is reflected by a different steering device of the array; and a plurality of attenuators, wherein each channel reflected by the array traverses one of the attenuators and the diffraction grating to the at least one output port. The router is able to dynamically adjust optical intensity of each wavelength channel by a different amount while also performing the function of wavelength routing.

11 Claims, 6 Drawing Sheets

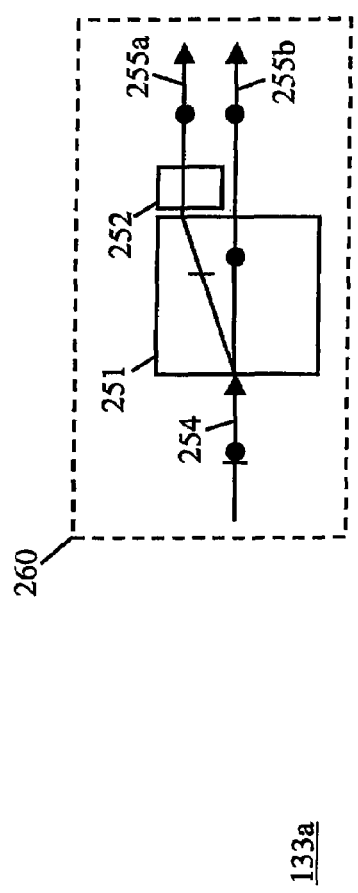
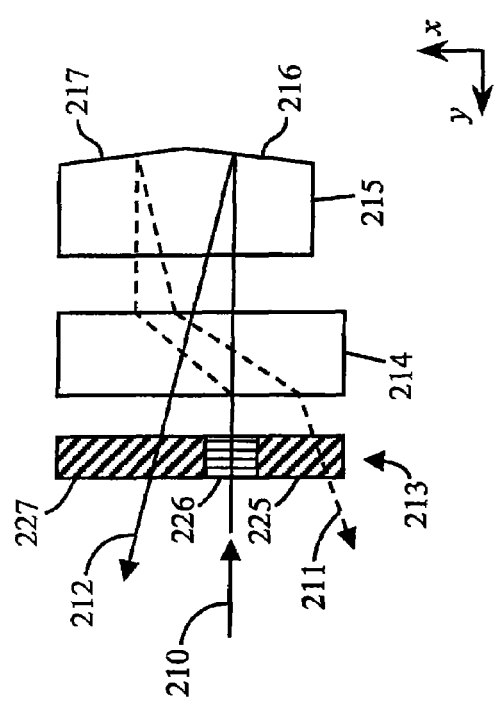
FIG. 3B
FIG. 3A

EQUALIZING OPTICAL WAVELENGTH ROUTERS

CROSS-REFERENCE TO RELATED APPLICATIONS

This application claims priority under 35 U.S.C §119(e) the benefit of U.S. Provisional Patent Application Ser. No. 60/314,351, entitled "Dynamic Equalizing Optical Wavelength Routers," filed on Aug. 22, 2001.

FIELD OF THE INVENTION

The present invention relates to optical channel routers that can independently route each of a plurality of wavelength division multiplexed optical channels to one of two separate outputs. More particularly, the present invention relates to such optical channel routers wherein, additionally, the relative intensities of the channels are equalized.

BACKGROUND OF THE INVENTION

In a wavelength division multiplexing optical communication system, information is carried by multiple channels each with a distinct wavelength. It is often necessary to add or drop a wavelength channel in optical links or networks. This can be achieved by a wavelength router that sends different wavelength channels to different locations. In addition to wavelength routing, the different wavelength channels typically have unequal intensities as they travel through the system. These unequal intensities can compromise the integrity of the information carried by the channels.

Accordingly, there exists a need for an improved channel equalizer and router for an optical network. The improved channel equalizer and router should be able to dynamically adjust optical intensity of each wavelength channel by a different amount while also performing the function of wavelength routing. The present invention addresses such a need.

SUMMARY OF THE INVENTION

A dynamic equalizing optical channel router includes an input port for receiving a wavelength division multiplexed composite optical signal comprising a plurality of channels; at least one output port; a diffraction grating optically coupled to the input and output ports; a lens optically coupled to the diffraction grating at a side opposite to the input and output ports; an array of steering devices optically coupled to the lens at a side opposite to the diffraction grating, wherein each channel is reflected by a different steering device of the array; and a plurality of attenuators, wherein each channel reflected by the array traverses one of the attenuators and the diffraction grating to the at least one output port. The router is able to dynamically adjust optical intensity of each wavelength channel by a different amount while also performing the function of wavelength routing.

In one preferred embodiment, the dynamic equalizing wavelength router comprises an input, at least two outputs, a diffraction grating optically coupled to the input and the at least two outputs, a lens optically coupled to the diffraction grating, an array of micro mirrors optically coupled to the lens opposite to the diffraction grating and at least two output apertures.

In one aspect of the present invention, the diffraction grating receives an input wavelength division multiplexed composite optical signal comprising a plurality of channels of different respective wavelengths and separates each channel to a different respective path. The lens focuses each one of the separated channels onto a different respective element of the array of micro-mirrors. Each individual element of the array of micro-mirrors reflects a channel back through the lens, through one of the at least two output apertures and to the diffraction grating along one of at least two alternative reflection pathways. The reflection pathway of each channel determines the output port to which the channel is directed as well as the degree of attenuation at the aperture through which it passes.

In another preferred embodiment, the dynamic equalizing wavelength router comprises an input, at least two outputs, a diffraction grating optically coupled to the input and the at least two outputs, a lens optically coupled to the diffraction grating, an array of polarization steering devices optically coupled to the lens opposite to the diffraction grating and at least one polarizer, wherein each polarization steering device within the array of polarization steering devices comprises a segmented polarization modulator, a birefringent beam displacer and a reflector comprising two reflective surfaces at an angle to one another.

In another aspect of the present invention, the diffraction grating receives an input wavelength division multiplexed composite optical signal comprising a plurality of channels of different respective wavelengths and separates each channel to a different respective path. The lens focuses each one of the separated channels onto a different respective element of the array of polarization steering devices such that the channel passes through a first polarization-controlling segment of the segmented polarization modulator comprising the element. Subsequently, the birefringent beam displacer deflects each channel to one or another of the two reflective surfaces according to the polarization provided by the polarization-controlling segment. The reflected channels pass through second polarization controlling segments of the segmented polarization modulator comprising the element such that a controlled, variable intensity of each channel is transmitted through the at least one polarizer and to one of the at least two outputs according to the polarization of the light comprising the channel.

In another preferred embodiment of the present invention, the dynamic equalizing wavelength router comprises an input, at least two outputs, a diffraction grating optically coupled to the input and the at least two outputs, a first lens optically coupled to the diffraction grating, a first polarization modulator array comprising a first segment and a second polarization modulator array comprising a second segment optically coupled to the lens opposite to the diffraction grating, a Wollaston prism optically coupled to the first and second polarization modulator arrays opposite to the first lens, a second lens optically coupled to the Wollaston prism opposite to the polarization modulator arrays, at least two optical wedges optically coupled to the second lens opposite to the Wollaston prism, an angled reflector optically coupled to the second lens and the at least two optical wedges and at least one polarizer.

In another aspect of the present invention, the diffraction grating receives an input wavelength division multiplexed composite optical signal comprising a plurality of channels of different respective wavelengths and separates each channel to a different respective path. The lens focuses each one of the separated channels onto a respective polarization-controlling element of the first polarization modulator array. Subsequently, the Wollaston prism deflects, according to the polarization provided by the polarization-controlling element, each channel to one or another of the two reflective surfaces comprising the angled reflector. The reflected channels pass back through the Wollaston prism and through respective polarization-controlling elements of the second polarization modulator array. The second polarization-controlling elements modulate the polarization of each channel such that a controlled, variable intensity of each channel is transmitted through the at least one polarizer and to one of the at least two outputs according to the polarization of the light comprising the channel.

Exemplary embodiments of the present invention may use one or more of the aspects described above, alone, or in combination.

BRIEF DESCRIPTION OF THE FIGURES

FIG. 3A and FIG. 3B are diagrams of a beam steering component utilized within the dynamic equalizing wavelength router of FIG. 2B.

DETAILED DESCRIPTION

The present invention provides dynamic equalizing wavelength router. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 5 in conjunction with the discussion below.

Figure 1:
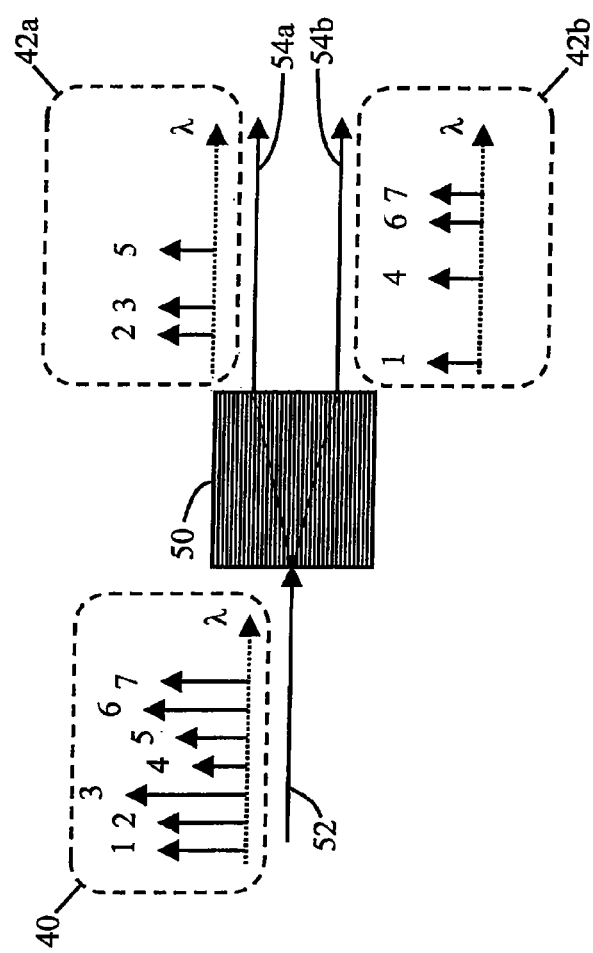
FIG. 1 is a functional diagram of dynamic equalizing wavelength routers.

A functional diagram of dynamic equalizing wavelength routers is illustrated in FIG. 1. A hypothetical spectrum of the incoming aggregated optical signal is shown in box 40. This incoming signal is input to the dynamic equalizing wavelength router 50 from input port 52 and contains multiple wavelength channels, for instance, channels 1-7, with different optical strengths. The dynamic equalizing wavelength router 50 directs any incoming wavelength channels to either of the two outgoing fiber ports 54a-54b. At the same time, the strength of each of the channels 1-7 can be adjusted to achieve channel equalization as illustrated in boxes 42a-42b.

Figure 2A:
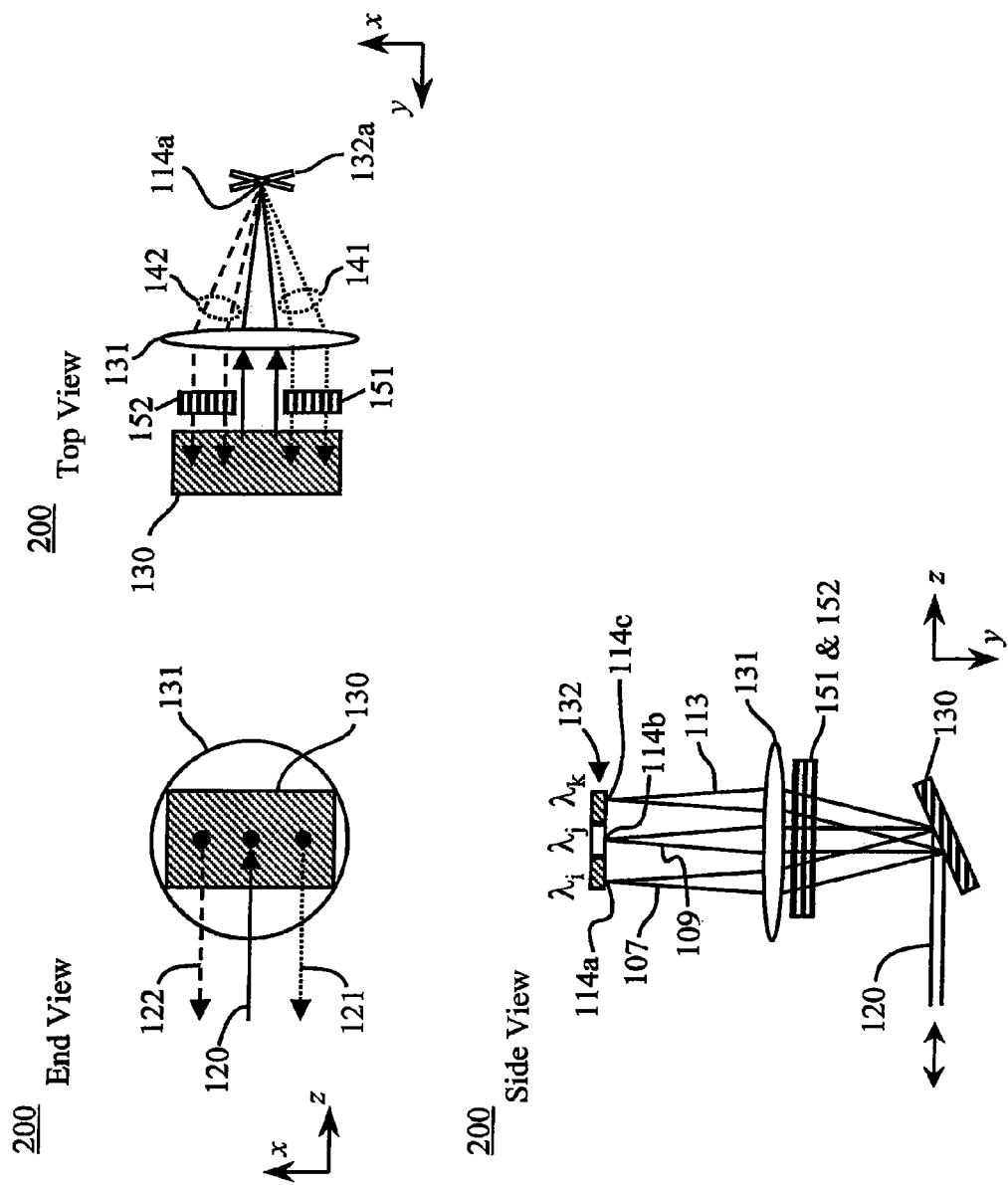
FIG. 2A is a set of diagrams of a first preferred embodiment of a dynamic equalizing wavelength router in accordance with the present invention.

Three mutually orthogonal views of a first preferred embodiment of a dynamic equalizing wavelength router in accordance with the present invention are illustrated in FIG. 2A. The dynamic equalizing wavelength router 200 shown in FIG. 2A is based on a micro-mirror array 132 modulator. In the router 200, a micro-mirror array 132 is disposed such that a different respective micro-mirror comprising the array 132 is disposed at each of the focal points 114a, 114b, etc. The "Side View" of FIG. 2A is assumed to represent a projection of the apparatus 200 onto the y-z plane and shows three channels $\lambda_i$, $\lambda_j$ and $\lambda_k$ dispersed by grating 130 and respectively focused to different points 114a, 114b and 114c by focal lens 131. Each micro mirror of the array 132 is disposed at a respective one of the focal points 114a, 114b and 114c as shown in the Side View of FIG. 2A.

Within the dynamic equalizing router 200 (FIG. 2A), a collimated input beam 120 is first spatially separated into wavelength channels by a diffraction grating 130. For example, the separated paths 107, 109 and 113 of the three channels $\lambda_i$, $\lambda_j$ and $\lambda_k$, respectively, are illustrated in FIG. 2A. Different wavelength channels are then focused onto different mirror "pixels" of the micro-mirror array modulator 132 by the focal lens 131. Each "mirror pixel", which is a separate independently controlled member of the micro-mirror array 132, can assume at least two positions, reflecting each wavelength into either a first direction 142 or a second direction 141 as illustrated in the x-y view of FIG. 2A. Each mirror comprising the array 132 may be tilted independently of every other micro-mirror. The Top View shown in FIG. 2A is a projection onto the x-y plane and shows the operation of only one mirror comprising the micro-mirror array 132, i.e., the particular mirror 132a disposed at the focal point 114a and receiving the channel $\lambda_i$. The mirror disposed at the point 114a receives the $\lambda_i$ channel focused by lens 131 and can tilt into any of a plurality of positions so as to redirect the reflected beam along a plurality of return paths back through the apparatus 200. The reflected channels or wavelengths propagating along each of the paths 141-142 are then recombined by the same diffraction grating 130 into output beams 121 and 122. By controlling the micro-mirror array 132, one can direct each wavelength into either one of the two output ports.

Further, to control the intensity of each wavelength channel, limiting apertures 151 and 152 are placed within the output beams 121 and 122 or the output beams 141 and 142. In practice, the lens apertures of output fiber collimators (not shown) can serve the purpose of these limiting apertures. The individual mirror pixels are controlled so that a portion of the beam is outside the limiting apertures. This way, by controlling the position of the mirror pixels attenuation of each wavelength channel can be achieved. Each mirror pixel can be configured to assume a continuous range of positions to accomplish continuous tuning of optical intensity of a wavelength channel.

Figure 2B:
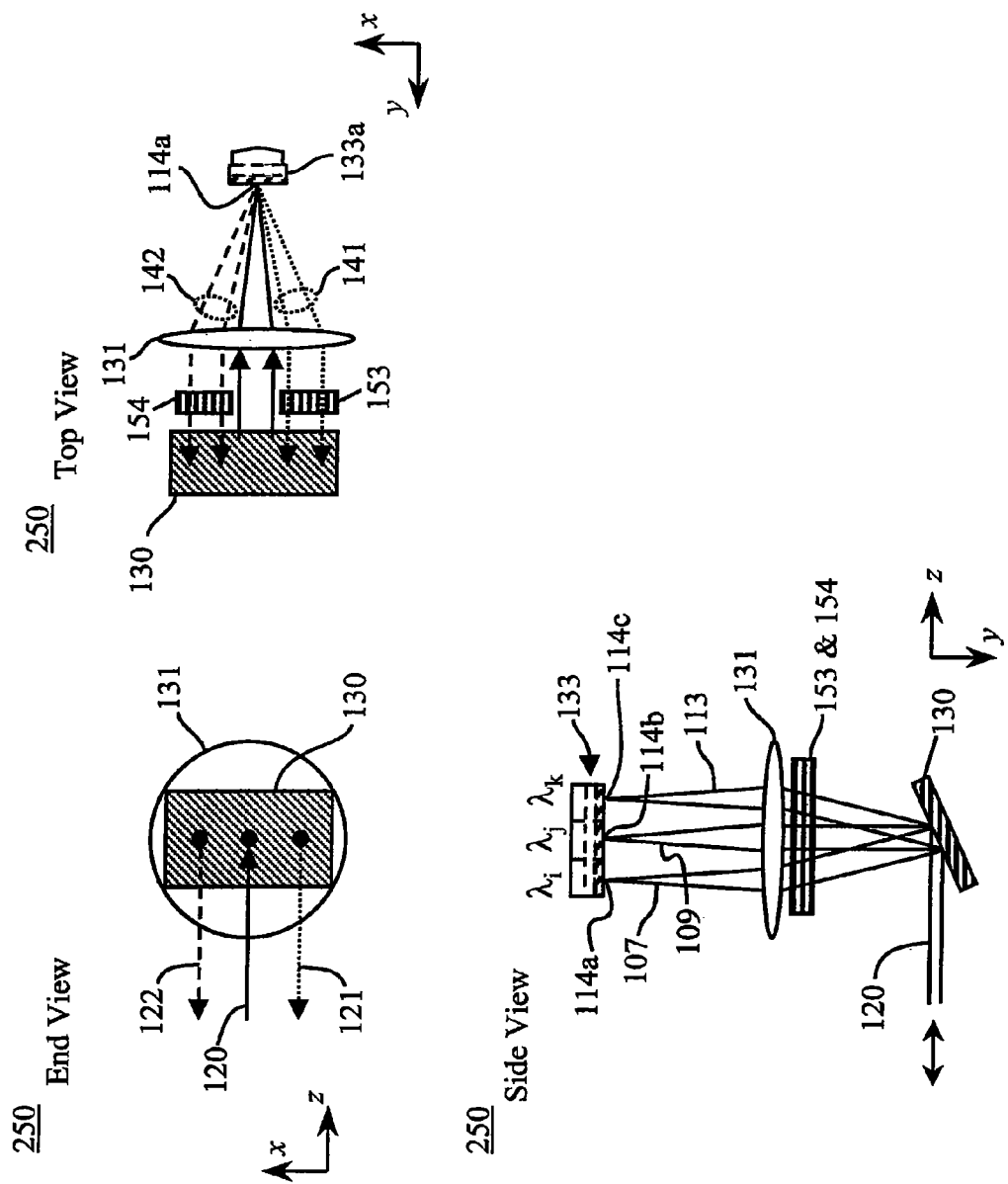
FIG. 2B is a set of diagrams of a second preferred embodiment of a dynamic equalizing wavelength router in accordance with the present invention.

The following illustrated embodiments of the present invention utilize polarization steering devices to replace the micro-mirror array modulator 132 to realize solid-state non-moving part wavelength routers. FIG. 2B provides an illustration of a second embodiment of a dynamic equalizing wavelength router in accordance with the present invention. Within the dynamic equalizing router 250 (FIG. 2B), an array 133 of polarization steering devices is utilized instead of an array of micro-mirrors. One representative element 133a of the polarization steering device array 133 is shown in the "Top View" of FIG. 2B. The dynamic equalizing router 250 further comprises polarizers 153 and 154, instead of apertures, disposed in the paths of the two output beams 121, 122.

An enlarged and more-detailed diagram of the representative polarization steering device element 133a is shown in FIG. 3A. FIG. 3A shows a cross section of the element 133a within the x-y plane. The polarization steering device element 133a includes a polarization modulator 213, a birefringent polarization beam displacer 214 and an angled reflector 215. The polarization modulator 213 can be a magneto-optical device, a liquid crystal device, or other polarization modulator that can rotate polarization of incident beams. The polarization modulator 213 further includes three segments, 225, 226, and 227. Each segment can be controlled independently. The birefringent polarization beam displacer 214 is a planar parallel uni-axial crystal plate with its optic axis inclined in the x-y plane. The angled reflector 215 consists of two reflective surfaces 216 and 217.

After passing through segment 226 of the polarization modulator 213 (FIG. 3A), the incident beam 210 becomes polarized parallel to either the x or z axis depending on a control signal sent to the center segment 226. If the beam after the modulator 213 is polarized in the z-axis, it is not displaced by the beam displacer 214. In this case the beam will be reflected by surface 216 forming returned beam 212. On the other hand, if after passing through the polarization modulator, the beam becomes polarized in the x-direction, the beam will be displaced by beam displacer 214 with a vector component of the displacement along the x-direction. Because of the displacement, the beam will be reflected by surface 217, which makes an angle from surface 216. The returned beam 211 thus will propagate in a direction significantly different from beam 212. The required displacement of beam displacer 214 is on the order of the beam size at the reflecting surfaces. In case the incident beam 210 is focused on the reflecting surfaces 216-217, the required displacement can be fairly small. Because displacement is linearly proportional to the thickness of the beam displacer, this means a very thin beam displacer will be sufficient.

Segments 225 and 227 are used to control the polarization state of the returned beam 211 and 212, respectively. After passing through segments 225 and 227, the returned beams can be polarized in either the x or z direction, or in any state in between, depending upon control signals applied to the segments. After passing through polarizers 153-154 (FIG. 2B), these different polarization states will result in different intensities. Using this mechanism, the intensities of the output beams 121, 122 can be controlled.

In order to direct different wavelength channels into different output ports, the polarization modulator 213 is pixelized in the z direction. In other words, the array 133 comprises a plurality of devices similar to that shown in FIG. 3A, wherein the separate devices are disposed along a line or curve in extending into or out of the plane of the drawing of FIG. 2B. The single beam displacer 214 and angled reflector 215 can suffice for all such elements of the array 133. However, a different polarization modulator 213 is generally required for each respective element of the array 133. The polarization steering device 133 can replace the micro-mirror array 132 in FIG. 2A. The input beam 120 will be focused onto the two mirror surfaces 216 and 217. Because the polarization steering device can be fairly thin, defocus effect at the polarization modulator may be negligible.

Essentially, wavelength routing is achieved through polarization steering by segment 226, and wavelength-selective attenuation is accomplished through polarization modulation by segments 225 and 227.

Although the input beam 120 is assumed to be linearly polarized in the second embodiment as well as the following embodiments, the invention can easily handle arbitrarily polarized and unpolarized input beams. As shown in the inset 260 in FIG. 3B, an arbitrarily polarized or unpolarized beam 254 can be separated into two parallel beams 255a-255b with a birefringent beam displacer 251. After the beam displacer 251, a half-wave plate 252 is inserted into one of the beams to rotate the polarization by 90 degrees. The output beams are thus both linearly polarized. Using this device in the input and output beams (that is, to the left of grating 130 in the y-z view of FIG. 2B), the embodiments using polarization steering devices become polarization independent.

Figure 4:
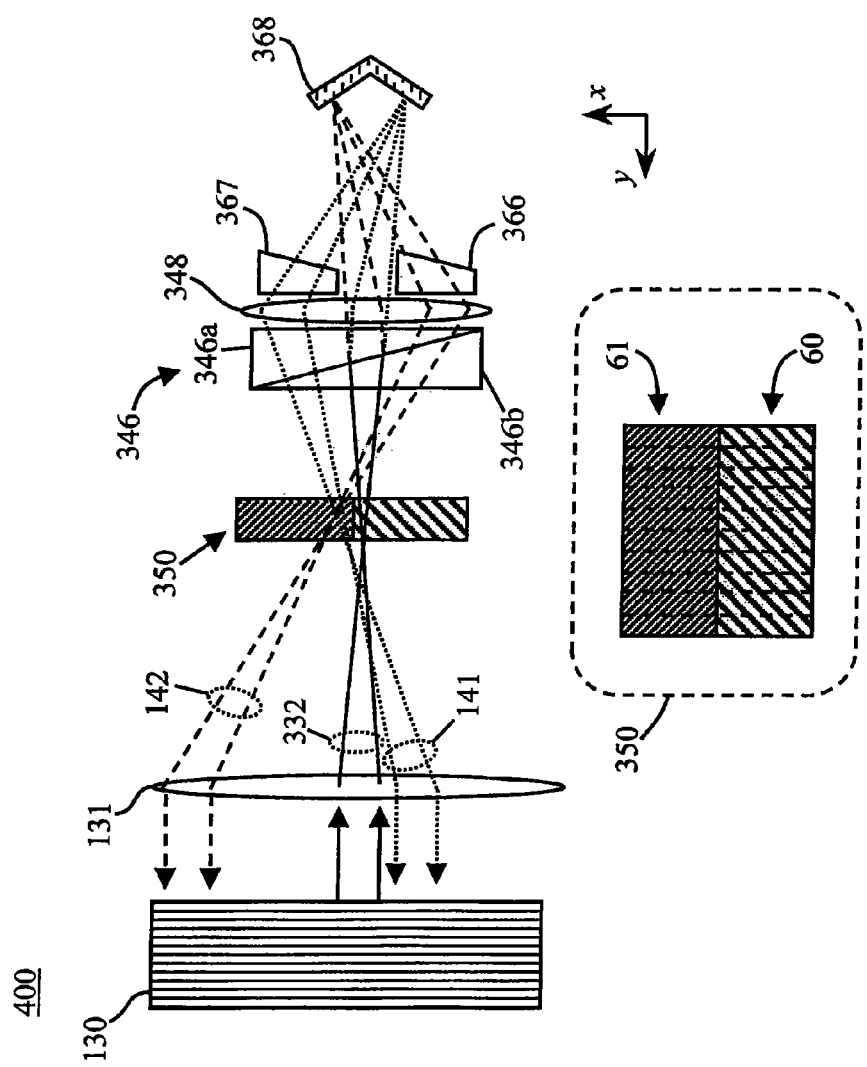
FIG. 4 is an illustration of a third preferred embodiment of a dynamic equalizing wavelength router in accordance with the present invention.

FIG. 4 is an illustration of a third preferred embodiment of a dynamic equalizing wavelength router in accordance with the present invention. The dynamic equalizing wavelength router 400 shown in FIG. 4 utilizes another type of polarization steering device. The polarization steering device uses a Wollaston prism 346 (or a birefringent wedge) to split the two polarizations onto two reflective surfaces of the angled mirror 368. In the embodiment shown in FIG. 4, a Wollaston prism 346 is utilized comprising the two birefringent wedges 346a-346b. The router 400 further comprises a segmented polarization modulator 350 optically coupled between the lens 131 and the Wollaston prism 346, a second lens 348 optically coupled to the Wollaston prism 346 and two optical wedges 366 and 367 optically coupled between the second lens 348 and the angled mirror 368 in the paths of the reflected beams 141-142.

The segmented polarization modulator 350 comprises a lower segment 60 comprising a first polarization modulator array and an upper segment 61 comprising a second polarization modulator array. Each polarization modulator array comprises a plurality of elements or "pixels". The individual pixels of each segment, which are indicated by dashed lines in the inset of FIG. 4, are individually controllable.

The diffracted channels 332 are focused on segment 60 of the segmented polarization modulator 350, with one wavelength or channel on each pixel. Each pixel of segment 60 modulates the polarization of the wavelength passing through it by a controlled variable amount. The Wollaston prism 346 then deflects all the wavelengths according to their respective polarizations. For instance, after passing through segment 60 of the polarization modulator 350, the polarization of light of the incoming wavelength 107 may be oriented along the x-axis or along the z-axis. The Wollaston prism then deflects this light along the pathway 141 (indicated by dotted lines) or along the pathway 142 (indicated by dashed lines) according to its polarization. These pathways reflect from different respective portions of the angled mirror 368 so as to pass back through one of the two optical wedges 366, 367, the second lens 348, the Wollaston prism 346, the segmented polarization modulator 350 and the lens 131 to the grating 130. The two pathways 141-142 lead to different outputs as described previously.

To achieve attenuation of each wavelength, the two optical wedges 366, 367 are inserted into the return beams as illustrated in FIG. 4. The wedges 366, 367 are designed so that the return beams 141-142 are focused on segment 61 of the polarization modulator 350. Pixels of segment 61 are then controlled to modulate the polarization states of each wavelength. Again, when the output beams subsequently pass through a polarizer or polarizers (not drawn in the figure) disposed in the output beams, each wavelength channel will have a different amount of attenuation depending on its polarization state.

It may be noted from FIG. 4 that the additional refraction caused by the optical wedges 366-367 may cause variation in the focal points of the return beams 141-142. In practice, in order to keep incoming and return beams focused at the same plane of the polarization modulator 350, a planar parallel plate (not shown) with the same thickness as wedges 366, 367 should be placed in the incoming beam between the two wedges. It is also noted that instead of placing wedges in the return beams 141-142, one could alternatively place a single wedge in the center beam to achieve the same beam separation effect at the modulator plane.

Figure 5:
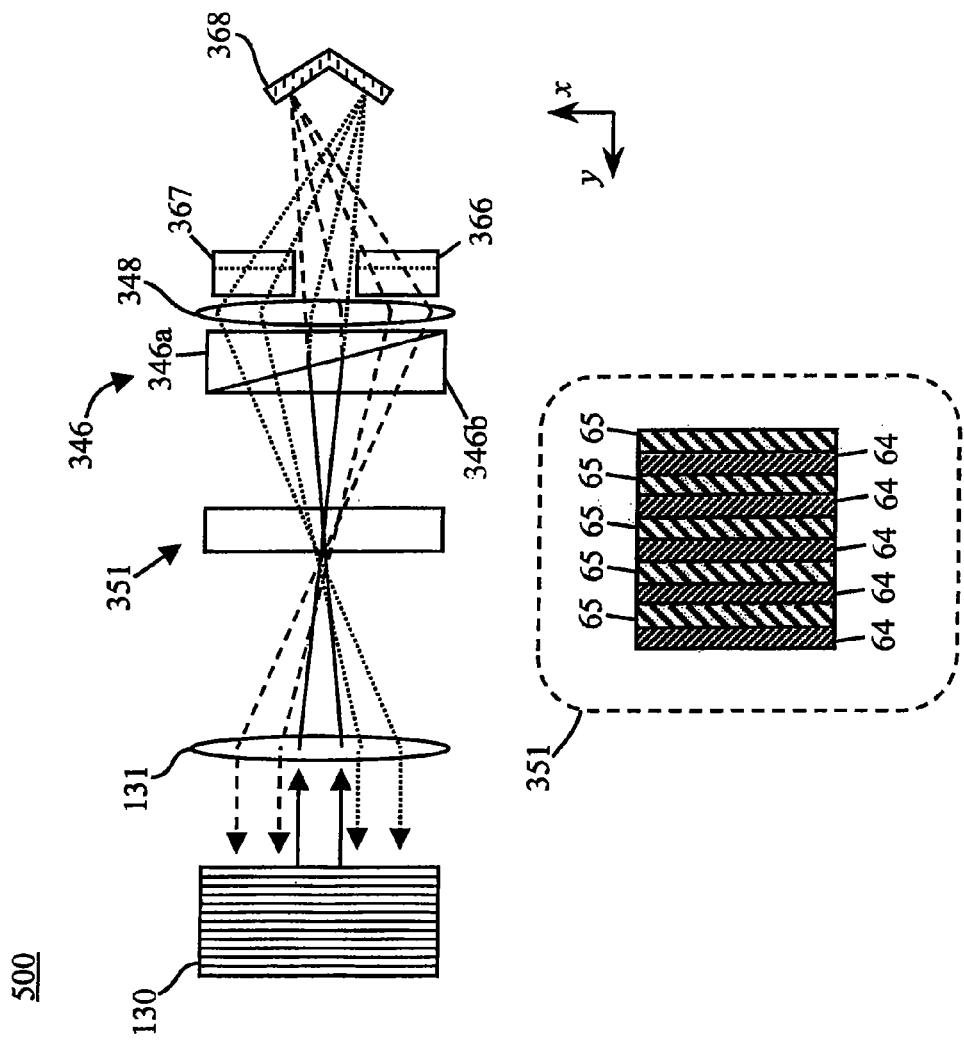
FIG. 5 is an illustration of a fourth preferred embodiment of a dynamic equalizing wavelength router in accordance with the present invention.

FIG. 5 is an illustration of a fourth preferred embodiment of a dynamic equalizing wavelength router in accordance with the present invention. The fourth embodiment 500 illustrated in FIG. 5 is similar to the third embodiment 400 (FIG. 4) except that the wedges are oriented with their changing thickness along the z direction (that is, into or out of the plane of the drawing). Further, the pixels of the polarization modulator 351 are configured differently than those within the polarization modulator 350. The incoming beam and return beams are thus separated in the z direction. The incoming beams or channels are focused on pixel set 64, whereas return beams or channels are focused on pixel set 65 of the segmented polarization modulator 351. Similar to other embodiments, pixel set 64 controls the direction of output beams and pixel set 65 controls attenuation of each wavelength channel.

A dynamic equalizing optical channel router has been disclosed. The router in accordance with the present invention comprises an input port for receiving a wavelength division multiplexed composite optical signal comprising a plurality of channels; at least one output port; a diffraction grating optically coupled to the input and output ports; a lens optically coupled to the diffraction grating at a side opposite to the input and output ports; an array of steering devices optically coupled to the lens at a side opposite to the diffraction grating, wherein each channel is reflected by a different steering device of the array; and a plurality of attenuators, wherein each channel reflected by the array traverses one of the attenuators and the diffraction grating to the at least one output port. The router in accordance with the present invention is able to dynamically adjust optical intensity of each wavelength channel by a different amount while also performing the function of wavelength routing.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dynamic equalizing wavelength router, comprising:
an input port for receiving a wavelength division multiplexed composite optical signal comprising a plurality of channels;
at least one output port;
a diffraction grating optically coupled to the input and output ports;
a lens optically coupled to the diffraction grating at a side opposite to the input and output ports;
an array of steering devices optically coupled to the lens at a side opposite to the diffraction grating, wherein each channel is reflected by a different steering device of the array; and
a plurality of polarizers, wherein each channel reflected by the array traverses one of the polarizers and the diffraction grating to the at least one output port.

2. The router of claim 1, wherein the array of steering devices comprises an array of micro-mirrors, wherein each channel is focused onto a different micro-mirror, wherein a position of each micro-mirror is independently controlled.

3. The router of claim 1, wherein the array of steering devices comprises an array of polarization steering devices.

4. The router of claim 3, wherein each of the polarization steering devices comprises:
a polarization modulator optically coupled to the lens at a side opposite to the diffraction grating, wherein the polarization modulator comprises first, second, and third segments, wherein the first, second and third segments are independently controlled, wherein the lens focuses a channel of the composite optical signal through the second segment;
a birefringent polarization beam displacer optically coupled to the polarization modulator at a side opposite to the lens; and
an angled reflector optically coupled to the birefringent polarization beam displacer at a side opposite to the polarization modulator,
wherein the angled reflector comprises a first reflective surface and a second reflective surface,
wherein a channel reflected by the first reflective surface traverses the first segment of the polarization modulator, wherein a channel reflected by the second reflective surface traverses the third segment of the polarization modulator.

5. The router of claim 1, wherein the array of steering devices comprises:
a segmented polarization modulator optically coupled to the lens at a side opposite to the diffraction grating, the segmented polarization modulator comprising a first polarization modulator array comprising a first plurality of segments, and a second polarization modulator array comprising a second plurality of segments, wherein each segment of the first and second plurality of segments are independently controlled, wherein the lens focuses each channel onto a different segment of the first plurality of segments;
a Wollaston prism optically coupled to the segmented polarization modulator at a side opposite to the lens;
a second lens optically coupled to the Wollaston prism at a side opposite to the segmented polarization modulator; and
an angled mirror optically coupled to the second lens comprising a first reflective surface and a second reflective surface.

6. The router of claim 5, further comprising of attenuators including a first optical wedge optically coupled to the second lens and the first surface of the angled mirror, and a second optical wedge optically coupled to the second lens and the second surface of the angled mirror, wherein each channel traversing the first optical wedge and the second optical wedge traverses a different segment of the second plurality of segments of the segmented polarization modulator.

7. The router of claim 1, further comprising:
a half-wave plate optically coupled to the diffraction grating at a side opposite to the lens; and
a birefringent beam displacer optically coupled to the half-wave plate at a side opposite to the diffraction grating.

8. A dynamic equalizing wavelength router, comprising:
an input port for receiving a wavelength division multiplexed composite optical signal comprising a plurality of channels;
at least one output port;
a diffraction grating optically coupled to the input and output ports;

a lens optically coupled to the diffraction grating at a side opposite to the input and output ports;

an array of polarization steering devices, wherein each channel is focused onto a different steering device, wherein each of the polarization steering device comprises:

a polarization modulator optically coupled to the lens at a side opposite to the diffraction grating, wherein the polarization modulator comprises first, second, and third segments, wherein the first, second and third segments are independently controlled, wherein the lens focuses a channel of the composite optical signal through the second segment, a birefringent polarization beam displacer optically coupled to the polarization modulator at a side opposite to the lens, and an angled reflector optically coupled to the birefringent polarization beam displacer at a side opposite to the polarization modulator, wherein the angled reflector comprises a first reflective surface and a second reflective surface, wherein a channel reflected by the first reflective surface traverses the first segment of the polarization modulator, wherein a channel reflected by the second reflective surface traverses the third segment of the polarization modulator; and a plurality of polarizers, wherein each channel reflected by the array traverses one of the polarizers and the diffraction grating to the at least one output port.

9. A dynamic equalizing wavelength router, comprising:

an input port for receiving a wavelength division multiplexed composite optical signal comprising a plurality of channels;

at least one output port;

a diffraction grating optically coupled to the input and output ports;

a first lens optically coupled to the diffraction grating at a side opposite to the input and output ports;

an array of polarization steering devices, comprising:

a segmented polarization modulator optically coupled to the first lens at a side opposite to the diffraction grating, the segmented polarization modulator comprising a first polarization modulator array comprising a first plurality of segments, and a second polarization modulator array comprising a second plurality of segments, wherein each segment of the first and second plurality of segments are independently controlled, wherein the first lens focuses each channel onto a different segment of the first plurality of segments, a Wollaston prism optically coupled to the segmented polarization modulator at a side opposite to the first lens, a second lens optically coupled to the Wollaston prism at a side opposite to the segmented polarization modulator, and an angled mirror optically coupled to the second lens comprising a first reflective surface and a second reflective surface;

a first optical wedge optically coupled to the second lens and the first surface of the angled mirror; and a second optical wedge optically coupled to the second lens and the second surface of the angled mirror, wherein each channel traversing the first optical wedge and the second optical wedge traverse a different segment of the second plurality of segments of the segmented polarization modulator and the diffraction grating to the at least one output port.

10. A system, comprising:

a wavelength division multiplexed composite optical signal comprising a plurality of channels, wherein the channels comprise unequal intensities; and a dynamic equalizing wavelength router, comprising:

an input port for receiving the optical signal, at least one output port, a diffraction grating optically coupled to the input and output ports, a lens optically coupled to the diffraction grating at a side opposite to the input and output ports, an array of polarization steering devices optically coupled to the lens at a side opposite to the diffraction grating, wherein each channel is reflected by a different steering device of the array, wherein each of the polarization steering devices comprises:

a polarization modulator optically coupled to the lens at a side opposite to the diffraction grating, wherein the polarization modulator comprises first, second, and third segments, wherein the first, second, and third segments are independently controlled, wherein the lens focuses a channel of the composite optical signal through the second segment;

a birefringent polarization beam displacer optically coupled to the polarization modulator at a side opposite to the lens; and an angled reflector optically coupled to the birefringent polarization beam displacer at a side opposite to the polarization modulator, wherein the angled reflector comprises a first reflective surface and a second reflective surface and wherein a channel reflected by the first reflective surface traverses the first segment of the polarization modulator, wherein a channel reflected by the second reflective surface traverses the third segment of the polarization modulator, and a plurality of attenuators, wherein each channel reflected by the array traverses one of the attenuators and the diffraction grating to the at least one output port as an attenuated wavelength division multiplexed composite optical signal, wherein the channels of the attenuated optical signal comprise approximately equal intensities.

11. The system of claim 10, wherein the plurality of attenuators comprises a plurality of polarizers.

* * * * *